(12) United States Patent
Quoniam (10) Patent No.: US 11,343,952 B2
(45) Date of Patent: May 31, 2022

(54) AGRICULTURAL TRACTOR HAVING A COMPONENT STORAGE SYSTEM

(71) Applicant: AGCO International GmbH, Neuhausen (CH)

(72) Inventor: Francois Quoniam, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 495 days.

(21) Appl. No.: 16/468,185

(22) PCT Filed: Dec. 5, 2017

(86) PCT No.: PCT/EP2017/081475
§ 371 (c)(1),
(2) Date: Jun. 10, 2019

(87) PCT Pub. No.: WO2018/104281
PCT Pub. Date: Jun. 14, 2018

(65) Prior Publication Data
US 2020/0068773 A1 Mar. 5, 2020

(30) Foreign Application Priority Data
Dec. 9, 2016 (EP) .................................. EP16290230

(51) Int. Cl.
*A01B 59/00* (2006.01)
*A01B 59/042* (2006.01)
(Continued)

(52) U.S. Cl.
CPC .......... *A01B 59/002* (2013.01); *A01B 59/042* (2013.01); *B60D 1/04* (2013.01); *B60D 1/145* (2013.01); *B60R 9/06* (2013.01)

(58) Field of Classification Search
CPC .... A01B 59/002; A01B 59/042; B60D 1/075; B60D 1/07; B60D 1/04; B60D 1/145; B60R 9/06
See application file for complete search history.

(56) References Cited

U.S. PATENT DOCUMENTS 2,797,957 A 7/1957 North
3,231,292 A 1/1966 Lorenz
(Continued)

FOREIGN PATENT DOCUMENTS

CN 105960870 A 9/2016
DE 2739909 A1 3/1979
(Continued)

OTHER PUBLICATIONS

UK Intellectual Property Office, Search Report Prepared for related Patent Application No. GB1621815.8, dated Jun. 22, 2017.
(Continued)

*Primary Examiner* — Tony H Winner
*Assistant Examiner* — Michael R Stabley (57) ABSTRACT

An agricultural tractor having a component storage system. The storage system including a storage bracket which is attached to the pick-up hitch of the tractor. The storage bracket allows for the storage of components of the pick-up hitch when not in use, e.g. a pick-up hitch hook, a drawbar. As the bracket is attached to the pick-up hitch itself, the components are stored in a convenient location for the tractor operator, to allow for hitch components to be changed in a relatively fast manner.

16 Claims, 7 Drawing Sheets (51) Int. Cl.
*B60D 1/04* (2006.01)
*B60D 1/145* (2006.01)
*B60R 9/06* (2006.01)

(56) References Cited

U.S. PATENT DOCUMENTS

| | | | | |
|---|---|---|---|---|
| 3,716,253 | A * | 2/1973 | Gniffke | B62D 49/02 |
| | | | | 280/416.2 |
| 4,570,986 | A | 2/1986 | Sams | |
| 5,727,803 | A * | 3/1998 | Johnson | B60D 1/141 |
| | | | | 280/416.2 |
| 6,125,945 | A | 10/2000 | Skaggs et al. | |
| 6,832,709 | B2 * | 12/2004 | Henry | B60D 1/06 |
| | | | | 224/403 |
| 7,784,813 | B2 * | 8/2010 | Columbia | B60D 1/06 |
| | | | | 280/511 |
| 8,079,611 | B2 * | 12/2011 | Schroeder | B60D 1/54 |
| | | | | 280/491.5 |
| 9,924,625 | B2 * | 3/2018 | Huegerich | B60D 1/66 |
| 2002/0014506 | A1 | 2/2002 | Teich | |
| 2003/0230744 | A1 | 12/2003 | Rawlinson | |
| 2006/0087101 | A1 | 4/2006 | Von | |
| 2008/0277950 | A1 | 11/2008 | Nees et al. | |
| 2010/0314899 | A1 | 12/2010 | Slacks | |
| 2016/0113189 | A1 * | 4/2016 | Huegerich | B60D 1/06 |
| | | | | 280/475 |

FOREIGN PATENT DOCUMENTS

| | | |
|---|---|---|
| EP | 2380804 A1 | 10/2011 |
| EP | 2397393 A2 | 12/2011 |
| PL | 162377 B1 | 10/1993 |
| WO | 2016/091942 A1 | 6/2016 |

OTHER PUBLICATIONS

European Patent Office, International Search Report for International Application No. PCT/EP2017/081475, dated Feb. 26, 2018.
China National Intellectual Property Administration, Office Action prepared for related Chinese Patent Application No. 201780075617.1, dated Sep. 23, 2021.

* cited by examiner

AGRICULTURAL TRACTOR HAVING A COMPONENT STORAGE SYSTEM

FIELD OF THE INVENTION

The present invention relates to an agricultural tractor having a component storage system.

BACKGROUND OF THE INVENTION

Some agricultural tractors, in particular within parts of Europe, are provided with pick-up hitches at the rear of the tractor. Such pick-up hitches comprise a hitching component, such as a hitch hook, which can be raised and lowered relative to the chassis of the tractor, to allow for ease of coupling with a trailer or other implement to be coupled with the tractor.

To provide for increased flexibility, the hook or other hitching component can be removed from the pick-up hitch, and replaced with another coupling component, e.g. a drawbar or towbar. However, the unused component must be stored on the tractor when not in use. In most modern tractors, such component storage is located towards the top of the tractor for high and medium horsepower models, and on the trumpet housing for low horsepower models. Such locations can present challenges for operator convenience, due to the additional effort required in accessing the storage locations.

Accordingly, it is an object of the invention to provide a tractor having a component storage system having increased operator convenience.

SUMMARY OF THE INVENTION

Accordingly, there is provided an agricultural tractor comprising a pick-up hitch, the tractor further comprising a storage bracket for tractor components, wherein the storage bracket is attached to the pick-up hitch, the storage bracket providing coupling elements for the storage of components of the pick-up hitch when the components are not in use.

Providing a storage bracket for pick-up hitch components allows for easy storage of such components when not in use. As the bracket is attached to the pick-up hitch itself, the components are stored in a convenient location for the tractor operator, to allow for hitch components to be changed in a relatively fast manner.

The pick-up hitch is preferably of the suspended type, wherein the height of the pick-up hitch is adjusted using hydraulic lifting rods, or a chain connection.

Preferably, the storage bracket is secured to the underside of the pick-up hitch, such that the storage bracket moves with the pick-up hitch.

Attaching the storage bracket to the underside of the hitch provides a convenient location for the bracket, which does not interfere with any other components of the tractor, and which can be relatively easily accessed for retrofitting of the bracket to existing tractors.

Preferably, the storage bracket is arranged such that components of the pick-up hitch can be stored adjacent to the pick-up hitch. Preferably, the storage bracket is arranged such that stored components for the pick-up hitch are located between the bracket and the chassis of the tractor when the pick-up hitch is in a raised position.

Accordingly, access to the stored components for the pick-up hitch can be facilitated by the lowering of the pick-up hitch and the attached bracket. As the stored components can be located beside the pick-up hitch itself, accordingly the components are conveniently located next to the hitch for access. In addition, the components can be stored in an unobtrusive location, which does not interfere with any other operations of the tractor.

Preferably, the storage bracket has a first storage element for storage of a pick-up hitch hook.

Preferably, the storage bracket has a second storage element for storage of a drawbar.

Preferably, the storage bracket is configured such that the first and second storage elements are arranged on opposed sides of the pick-up hitch, when the storage bracket is attached to the pick-up hitch.

Preferably, the agricultural tractor comprises a pick-up hitch hook which can be releasably attached to the pick-up hitch, wherein the first storage element comprises first and second projecting members which are received in corresponding first and second apertures provided in the pick-up hitch hook, to secure the pick-up hitch hook to the storage bracket.

Preferably, at least one of the first and second apertures of the pick-up hitch hook comprises a through-going aperture, wherein at least one of the first and second projecting members extends through the through-going aperture, the pick-up hitch hook secured using a locking pin at a free end of said at least one projecting member.

Preferably, the agricultural tractor comprises a drawbar which can be releasably attached to the pick-up hitch, at least a portion of the drawbar received within a portion of the second storage element to retain the drawbar on the storage bracket when the drawbar is not in use.

Preferably, the drawbar comprises a first clevis fastener end having a clevis and a clevis pin and an opposed second end, wherein the second storage element comprises a coupling mouth arranged to receive the clevis pin of the clevis end when the clevis pin is secured in the clevis, and wherein the second storage element further comprises a locking pin arranged to secure the opposed second end of the drawbar to the storage bracket, to secure the drawbar to the storage bracket.

Preferably, the drawbar is provided with at least one aperture, preferably at lease on through-going aperture, located towards the opposed second end of the drawbar, wherein the locking pin is received in the at least one aperture to secure the drawbar to the storage bracket.

Preferably, the storage bracket is configured such that the drawbar is secured to the storage bracket on its side, to minimise the height of the drawbar when in the stored position.

It will be understood that the storage bracket additionally or alternatively can comprise storage elements for the retention of other pick-up hitch components, e.g. a piton or ball hitch element.

There is further provided a bracket for use in a storage system of a tractor as described above.

Preferably, the bracket is provided as a component for retrofitting to a tractor having a pick-up hitch.

BRIEF DESCRIPTION OF THE DRAWINGS

Embodiments of the invention will now be described, by way of example only, with reference to the accompanying drawings, in which.

The drawings are provided by way of reference only, and will be acknowledged as not to scale.

DETAILED DESCRIPTION OF THE INVENTION

Figure 1:
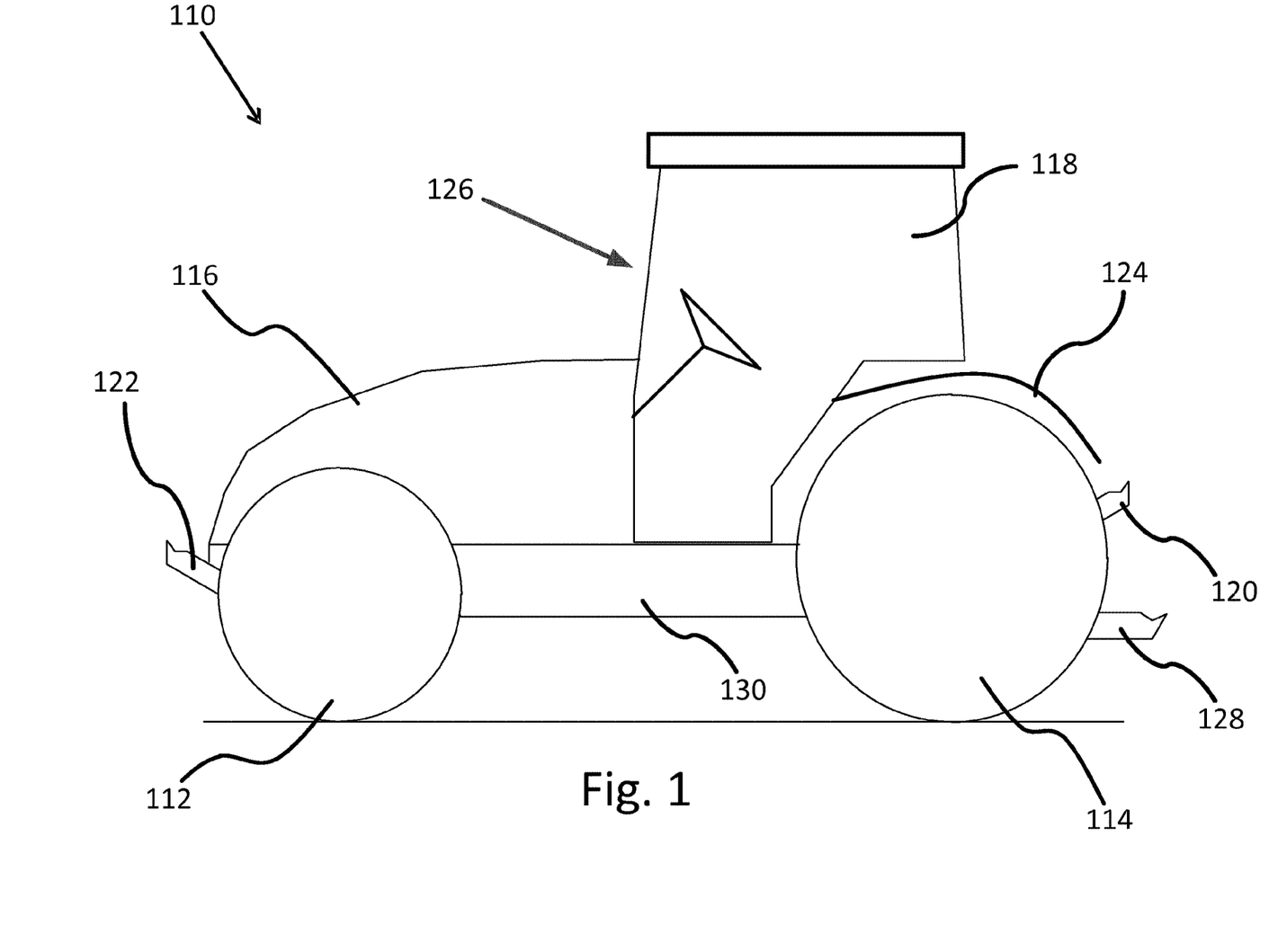
FIG. 1 is a side view of an agricultural tractor having a component storage system according to the invention.

With reference to FIG. 1, a vehicle according to the invention in the form of an agricultural tractor is indicated at 110. The tractor 110 comprises front wheels 112 and rear wheels 114, a forward engine section 116 and a cab section 118. A rear linkage 120 is provided at the rear of the tractor 110, and a front linkage 122 is provided at the front of the tractor 110. The front and rear linkages 120,122 can be actuated or moved using associated hydraulic cylinders. Rear fenders 124 are provided to cover a portion of the rear wheels 114.

Within the cab 118, an operator station 126 is provided, where the operator can be presented with display information relating to tractor operation, and where the operator can control different elements of the tractor 110, e.g. hydraulic circuits, lifting systems, and/or to control the acceleration and steering of the tractor 110.

The tractor 110 is further provided with a pick-up hitch 128 at the rear of the tractor 100, wherein the pick-up hitch 128 can be raised and lowered relative to the chassis 130 of the tractor 110, to allow for ease of coupling with a trailer or other implement to be coupled with the tractor 110.

The tractor 110 further comprises a component storage system, which is now described with reference to FIGS. 2-7.

Figure 2:
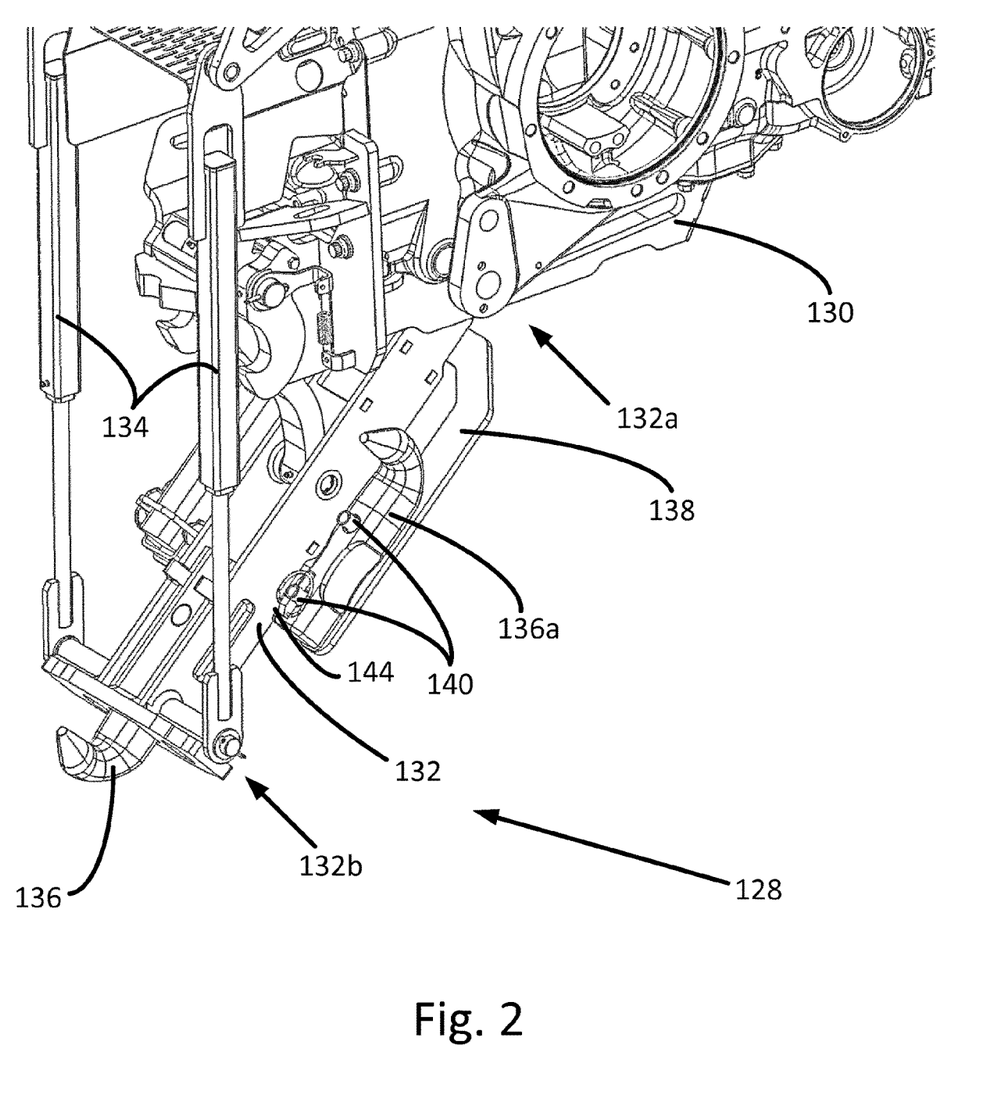
FIG. 2 is an enlarged perspective view of the pick-up hitch and storage system according to the invention, when the pick-up hitch is in a lowered position.

With reference to the enlarged view in FIG. 2, the pick-up hitch 128 comprises a beam body 132 coupled to the tractor chassis 130 at a first end 132a of the beam body 132, the opposed second end 132b of the beam body 132 attached with adjustable elements in the form of hydraulic lifting arms 134. The second end 132b of the beam body 132 can be raised and lowered relative to the tractor chassis 130, to allow the pick-up hitch 128 to couple with trailers or other hitched implements. Lowered views of the pick-up hitch 128 are shown in FIGS. 2, 4, 6 and 7, while raised views of the pick-up hitch 128 are shown in FIGS. 3 and 5.

The pick-up hitch 128 is provided with a pick-up hitch hook 136 which can be releasably retained in the second end 132b of the hitch beam body 132. The hook 136 can be removed from the beam body 132 to allow for the use of other coupling components, which can be secured to the beam body 132, e.g. drawbars, towbars, pinions, etc.

The tractor 110 further comprises a storage bracket 138 which is secured to the underside of the beam body 132 of the pick-up hitch 128. The storage bracket 138 comprises coupling elements which allow for the storage of components of the pick-up hitch 128 when the components are not in use.

Figure 3:
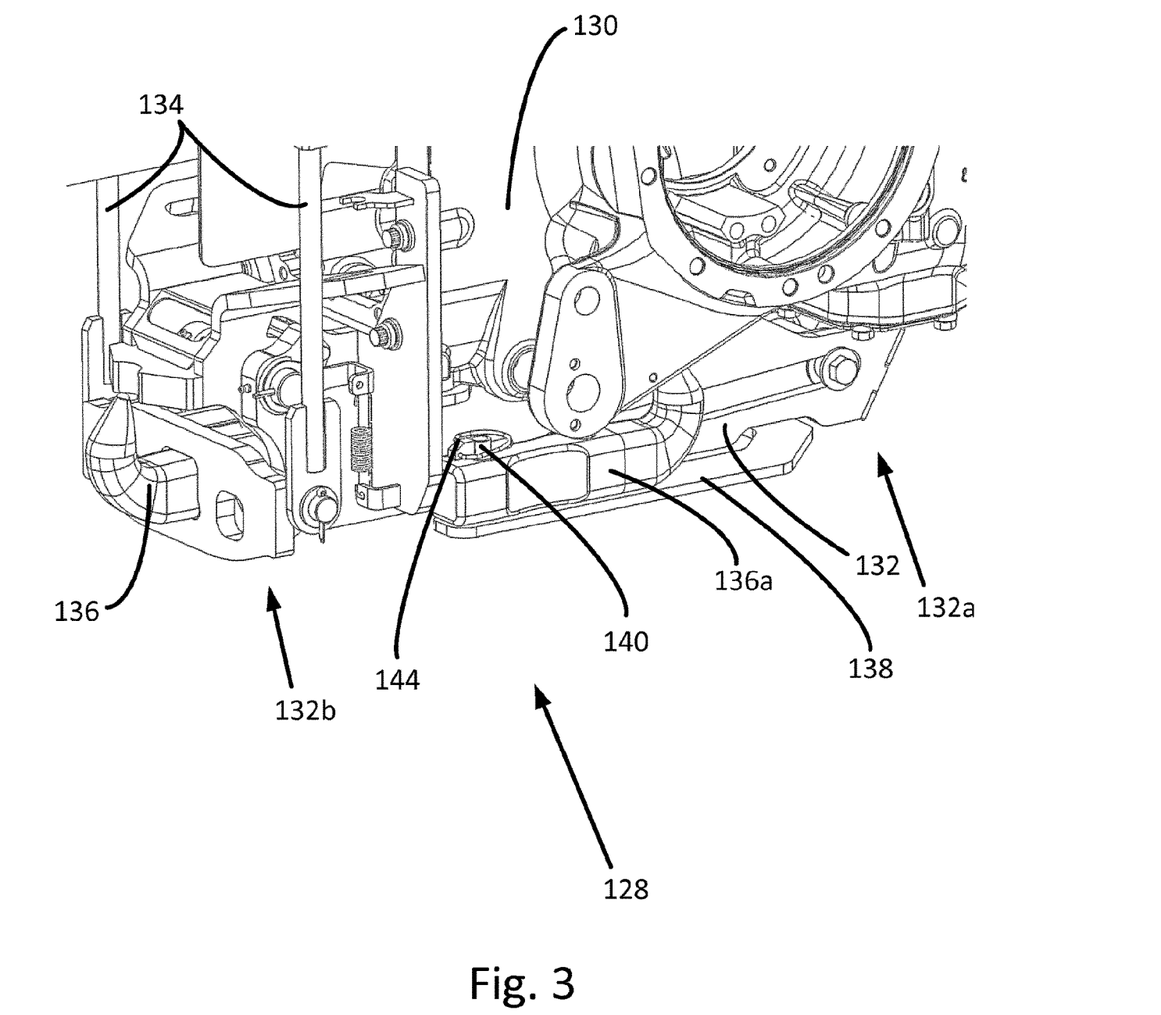
FIG. 3 is an enlarged perspective view of the pick-up hitch of FIG. 2 when in a raised position.

It will be understood that the tractor 110 is generally provided with a single pick-up hitch hook, but for ease of understanding, and with reference to the views shown in FIGS. 2 and 3, the position of the pick-up hitch hook 136 when retained by the storage bracket 138 is illustrated by a second pick-up hitch hook 136a. The storage bracket 138 comprises a first storage element in the form of a pair of projecting members 140. The first storage element is configured to couple and retain the pick-up hitch hook 136a on the storage bracket 138. The projecting members 140 are arranged to be received in and extend through a pair of through-going apertures provided on the pick-up hitch hook 136a. A locking pin 144 couples with a free end of one of the projecting member 140, to lock the pick-up hitch hook 136a in place on the storage bracket 138.

Figure 4:
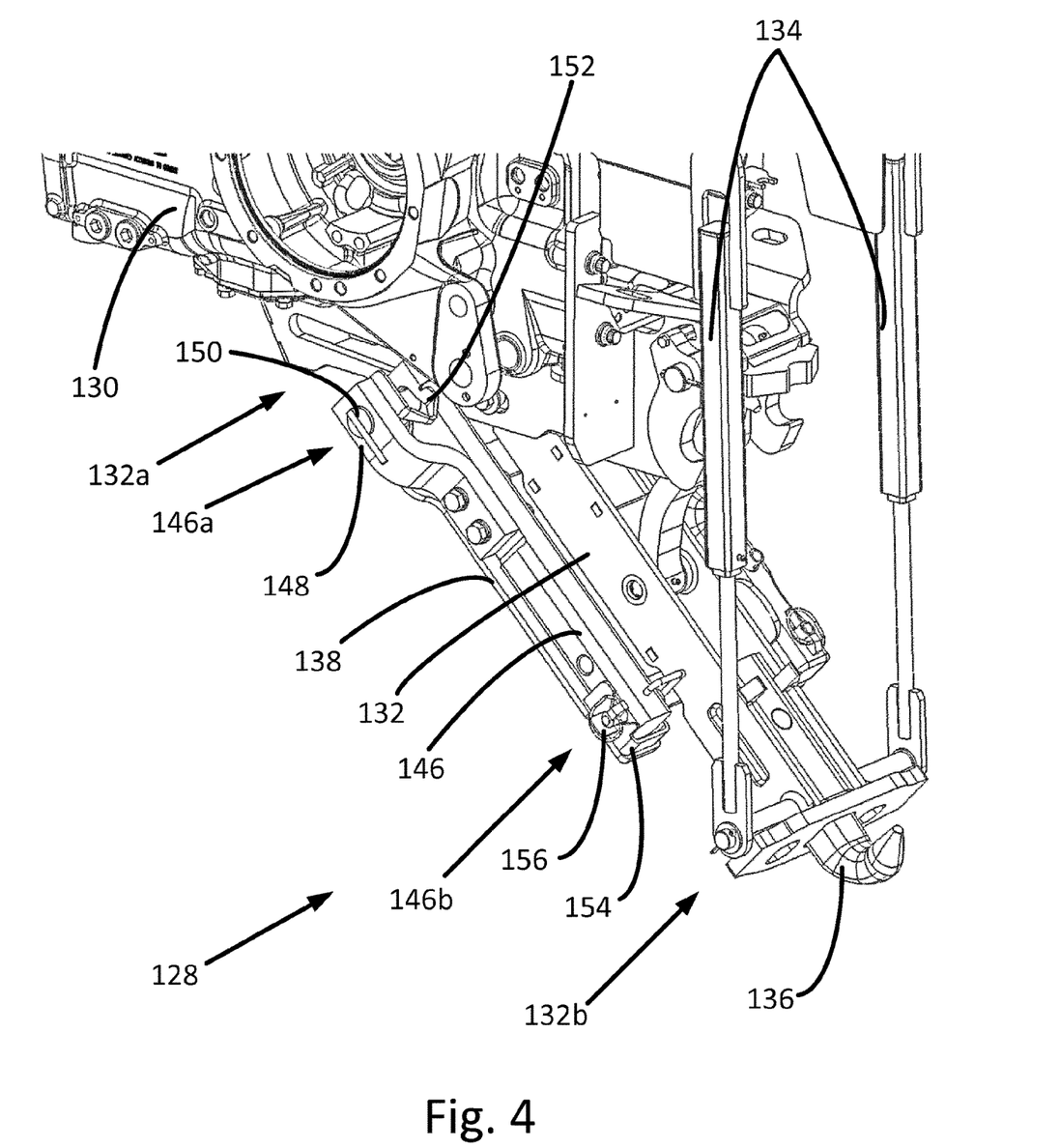
FIG. 4 is an enlarged perspective view of the pick-up hitch of FIG. 2 from the opposite side of the hitch.
Figure 5:
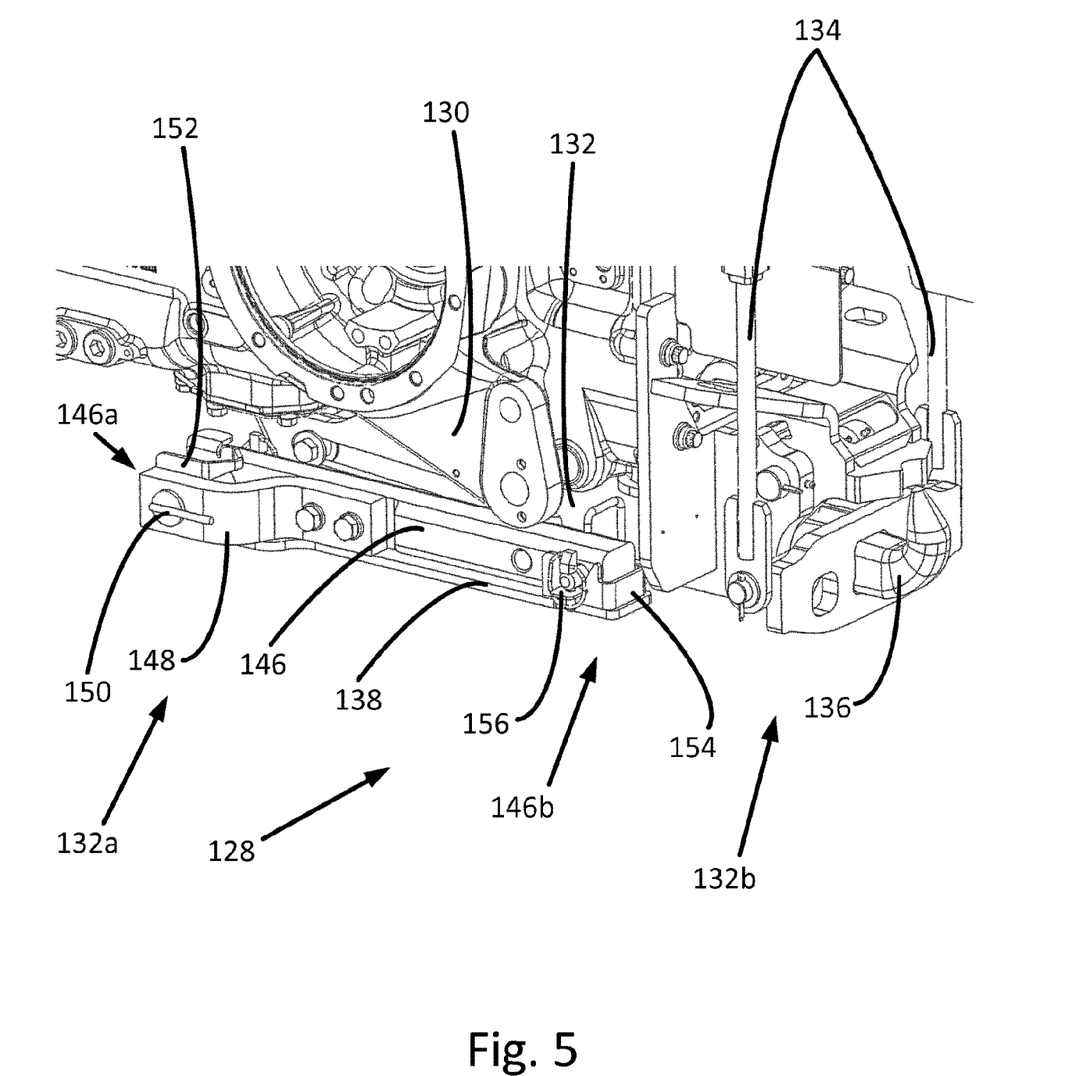
FIG. 5 is an enlarged perspective view of the pick-up hitch of FIG. 4 when in a raised position.

With reference to the views shown in FIGS. 4 and 5, the tractor 110 further comprises a drawbar 146, which can be releasably retained within the beam body 132 of the pick-up hitch 128 in place of the hook 136, to provide a drawbar coupling for the tractor 110. The drawbar 146 comprises a first clevis fastener end 146a having a clevis 148 and a clevis pin 150 and an opposed second end 146b. When not in use, the drawbar 146 is retained by the storage bracket 138.

The storage bracket 138 comprises a second storage element in the form of a coupling mouth 152 and a coupling flange 154. The coupling mouth 152 is shaped to receive the clevis pin 150 of the clevis end 146a of the drawbar 146. The opposed second end 146b can be coupled with the coupling flange 154 using a locking pin 156 which can be positioned in a through-going aperture of the drawbar 146.

Figure 6:
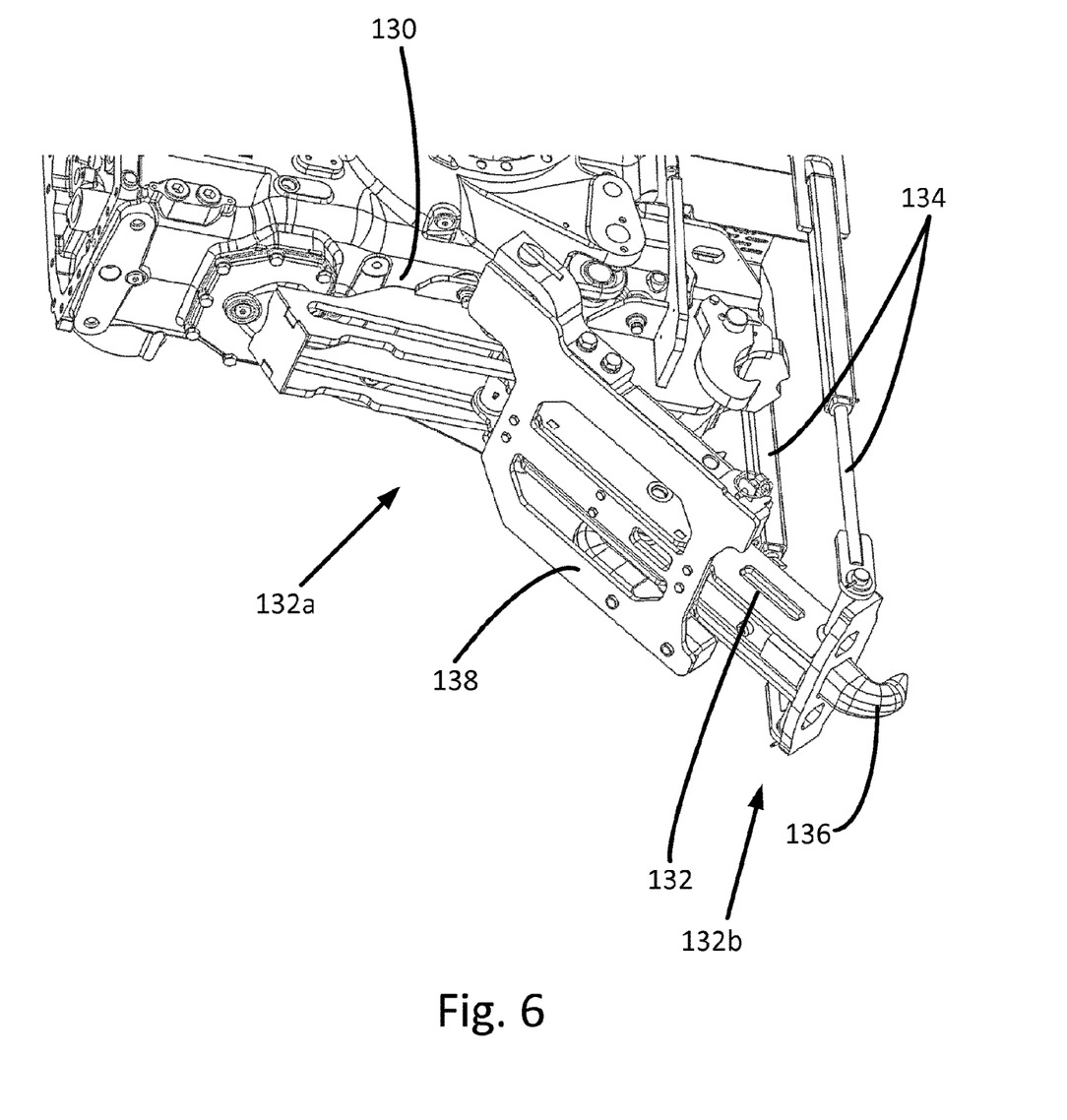
FIG. 6 is a bottom perspective view of the pick-up hitch of FIG. 4.
Figure 7:
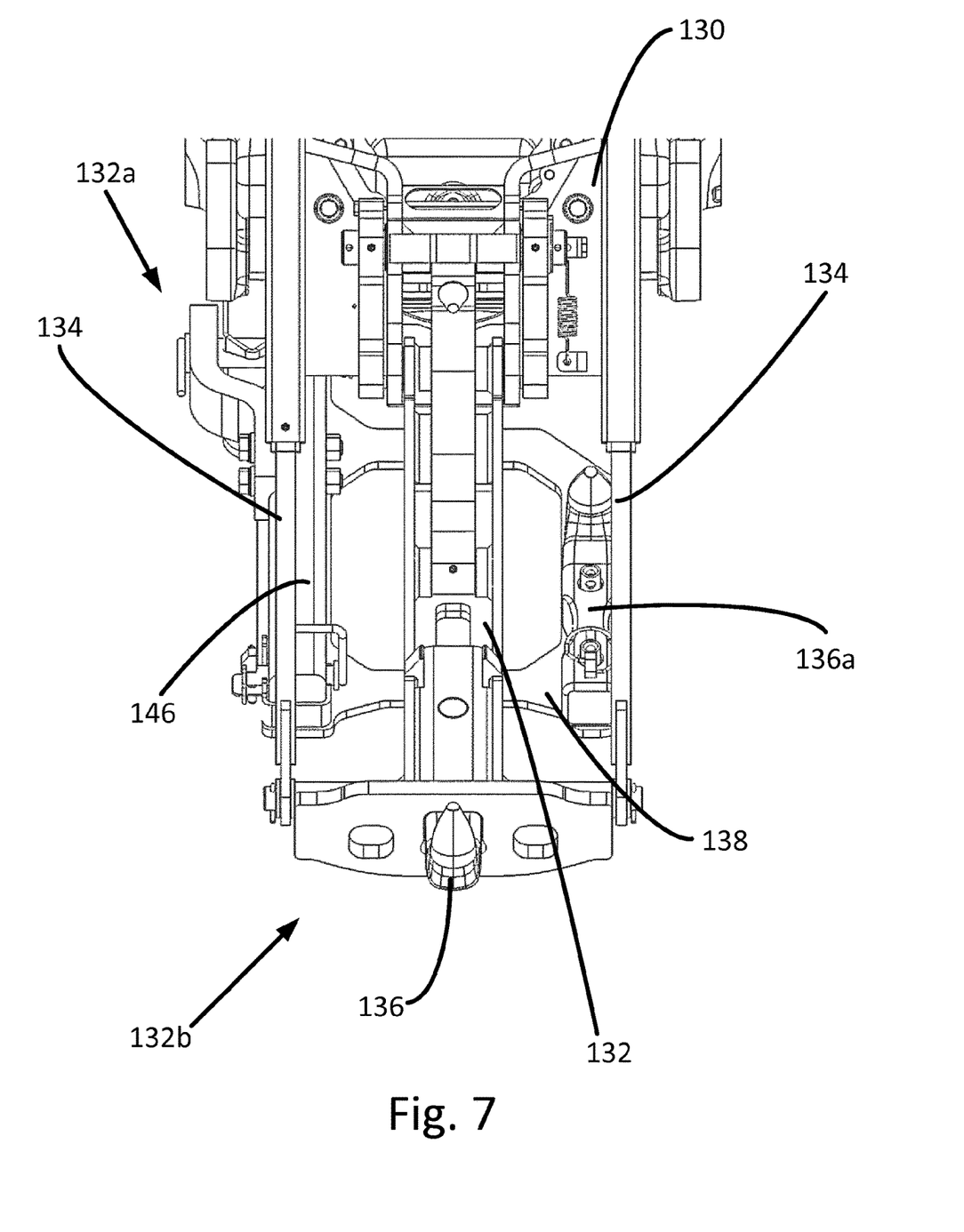
FIG. 7 is an enlarged rear view of the pick-up hitch and storage system according to the invention.

As can be seen in FIGS. 4-6, the drawbar 146 is secured to the storage bracket 138 on its side, to minimise the height of the drawbar 146 when in the stored position on the bracket 138. In addition, as can be seen from the figures, the storage bracket 138 is configured such that the components to be stored on the bracket 138 are located on either side of the beam body 132 of the pick-up hitch 128, allowing for ease of access to the stored components 136a, 146 for an operator accessing the hitch 128. Positioning the components 136a, 146 adjacent the beam body 132 has the result that the components 136a, 146 can be safely stored beneath the tractor chassis 130 when the pick-up hitch 128 is in the raised position. Access to the stored components 136a, 146 can be facilitated by moving the hitch 128 to the lowered position, as shown in FIGS. 2, 4, 6 and 7.

The use of a storage bracket 138 attached to the underside of the pick-up hitch 128 for the storage of hitch components when not in use, allows for the components to be retained in a convenient location for the tractor operator, to allow for hitch components to be changed in a relatively fast manner. In addition, the coupling ends of the respective components, e.g. the hook of the pick-up hitch hook 136a and the clevis 148 of the drawbar 146, can be located distal from the second end 132b of the beam body 132 of the pick-up hitch 128, such that the coupling ends do not get in the way of an operator when using the pick-up hitch 128.

It will be understood that the storage bracket 138 may be provided as an integrated component of the tractor 110, or as a separate component for retrofitting to an existing tractor.

The invention is not limited to the embodiments described herein, and may be modified or adapted without departing from the scope of the present invention.

The invention claimed is:

1. An agricultural tractor comprising a pick-up hitch, the tractor further comprising a storage bracket for tractor components, wherein the storage bracket is secured to the underside of the pick-up hitch, such that the storage bracket moves with the pick-up hitch, the storage bracket providing coupling elements for the storage of components of the pick-up hitch when the components are not in use.

2. The agricultural tractor of claim 1, wherein the storage bracket is arranged such that components of the pick-up hitch can be stored adjacent to the pick-up hitch.

3. The agricultural tractor of claim 2, wherein the storage bracket is arranged such that stored components for the pick-up hitch are located between the bracket and the chassis of the tractor when the pick-up hitch is in a raised position.

4. The agricultural tractor of claim 1, wherein access to the stored components for the pick-up hitch is facilitated by the lowering of the pick-up hitch and the attached bracket.

5. The agricultural tractor of claim 1, wherein the storage bracket has a first storage element for storage of a pick-up hitch hook.

6. The agricultural tractor of claim 5, wherein the storage bracket has a second storage element for storage of a drawbar.

7. The agricultural tractor of claim 6, wherein the storage bracket is configured such that the first and second storage elements are arranged on opposed sides of the pick-up hitch, when the storage bracket is attached to the pick-up hitch.

8. The agricultural tractor of claim 5, wherein the agricultural tractor comprises a pick-up hitch hook which can be releasably attached to the pick-up hitch, wherein the first storage element comprises first and second projecting members which are received in corresponding first and second apertures provided in the pick-up hitch hook, to secure the pick-up hitch hook to the storage bracket.

9. The agricultural tractor of claim 8, wherein at least one of the first and second apertures of the pick-up hitch hook comprises a through-going aperture, wherein at least one of the first and second projecting members extends through the through-going aperture, the pick-up hitch hook secured using a locking pin at a free end of said at least one projecting member.

10. The agricultural tractor of claim 5, wherein the agricultural tractor comprises a drawbar which can be releasably attached to the pick-up hitch, at least a portion of the drawbar received within a portion of a second storage element to retain the drawbar on the storage bracket when the drawbar is not in use.

11. The agricultural tractor of claim 10, wherein the drawbar comprises a first clevis fastener end having a clevis and a clevis pin and an opposed second end, wherein the second storage element comprises a coupling mouth arranged to receive the clevis pin of the clevis end when the clevis pin is secured in the clevis, and wherein the second storage element further comprises a locking pin arranged to secure the opposed second end of the drawbar to the storage bracket, to secure the drawbar to the storage bracket.

12. The agricultural tractor of any claim 11, wherein the drawbar is provided with at least one aperture, preferably at lease on through-going aperture, located towards the opposed second end of the drawbar, wherein the locking pin is received in the at least one aperture to secure the drawbar to the storage bracket.

13. The agricultural tractor of claim 10, wherein the storage bracket is configured such that the drawbar is secured to the storage bracket on its side, to minimise the height of the drawbar when in the stored position.

14. A storage bracket comprising coupling elements for the storage of components of a pick-up hitch for use in an agricultural tractor as claimed in claim 1.

15. An agricultural tractor comprising a pick-up hitch, the tractor further comprising a storage bracket for tractor components, wherein the storage bracket is attached to the pick-up hitch, wherein the storage bracket has a first storage element for storage of a pick-up hitch hook, the storage bracket providing coupling elements for the storage of components of the pick-up hitch when the components are not in use, and wherein the agricultural tractor comprises a pick-up hitch hook which can be releasably attached to the pick-up hitch, wherein the first storage element comprises first and second projecting members which are received in corresponding first and second apertures provided in the pick-up hitch hook, to secure the pick-up hitch hook to the storage bracket.

16. An agricultural tractor comprising a pick-up hitch, the tractor further comprising a storage bracket for tractor components, wherein the storage bracket is attached to the pick-up hitch, wherein the storage bracket has a first storage element for storage of a pick-up hitch hook, the storage bracket providing coupling elements for the storage of components of the pick-up hitch when the components are not in use, and wherein the agricultural tractor comprises a drawbar which can be releasably attached to the pick-up hitch, at least a portion of the drawbar received within a portion of a second storage element to retain the drawbar on the storage bracket when the drawbar is not in use, wherein the drawbar comprises a first clevis fastener end having a clevis and a clevis pin and an opposed second end, wherein the second storage element comprises a coupling mouth arranged to receive the clevis pin of the clevis end when the clevis pin is secured in the clevis, and wherein the second storage element further comprises a locking pin arranged to secure the opposed second end of the drawbar to the storage bracket, to secure the drawbar to the storage bracket.

\* \* \* \* \*